US010630496B2

(12) United States Patent
Lifshitz et al.

(10) Patent No.: US 10,630,496 B2
(45) Date of Patent: Apr. 21, 2020

(54) SYSTEM AND METHOD FOR MANAGING ONLINE CHARGING SESSIONS

(71) Applicant: SANDVINE INCORPORATED ULC, Waterloo (CA)

(72) Inventors: Yuval Lifshitz, Kfar Haoranim (IL); Said Zaghloul, Waterloo (CA); Chandan Kumar Sharma, Asha Bhavan (IN)

(*) Notice: Subject to any disclaimer, the term of this patent is extended or adjusted under 35 U.S.C. 154(b) by 0 days.

(21) Appl. No.: 14/684,484

(22) Filed: Apr. 13, 2015

(65) Prior Publication Data
US 2015/0319313 A1 Nov. 5, 2015

(30) Foreign Application Priority Data
Apr. 30, 2014 (IN) .......................... 1165/DEL/2014

(51) Int. Cl.
*H04W 8/02* (2009.01)
*H04L 12/14* (2006.01)
(Continued)

(52) U.S. Cl.
CPC ...... *H04L 12/1467* (2013.01); *H04L 12/1407* (2013.01); *H04M 15/64* (2013.01);
(Continued)

(58) Field of Classification Search
CPC .......................... H06Q 20/145; H04M 15/64
(Continued)

(56) References Cited

U.S. PATENT DOCUMENTS

2013/0339783 A1* 12/2013 Fernandez Alonso ...................... H04L 12/1407
714/4.11
2014/0086052 A1 3/2014 Cai et al.
(Continued)

FOREIGN PATENT DOCUMENTS

| WO | WO 2014/033534 A2 | 3/2014 | |
| WO | 2014049433 | 4/2014 | |
| WO | WO 2014049433 A2 * | 4/2014 | ......... H04L 41/0663 |

OTHER PUBLICATIONS

Nokia Siemens Networks, "Correction on CDR generation for EPC Charging", 3GPP Draft, S5-081592 R8 CR 32251 CDR Generation (3GPP), Mobile Competence Centre, 650, Route Des Lucioles; F-06921 Sophia-Antipolis Cedex; France, No. Dalian, China; Oct. 5, 2008, Oct. 5, 2008.

(Continued)

*Primary Examiner* — Gary Lafontant
(74) *Attorney, Agent, or Firm* — Gowling WLG (Canada) LLP; Neil W. Henderson

(57) ABSTRACT

A method and system for managing online charging sessions is provided. The method includes: establishing a subscriber data session on a network; establishing a connection with an initial online charging system; detecting a condition change in the subscriber data session; determining whether the condition change is associated with a change in the online charging system; if the condition change is associated with a change in the online charging system, determining a new online charging system; terminating the connection to the initial online charging system while maintaining the subscriber data session; and establishing a connection with the new online charging system; otherwise continuing the session with the initial online charging system. The system includes a control plane engine and is operatively connected to a policy charging enforcement function.

11 Claims, 9 Drawing Sheets

(51) Int. Cl.
*H04M 15/00* (2006.01)
*H04W 8/18* (2009.01)
*H04W 76/10* (2018.01)
*H04W 4/029* (2018.01)
*H04W 4/24* (2018.01)
*H04W 28/08* (2009.01)
*H04W 76/12* (2018.01)
*H04W 76/32* (2018.01)

(52) U.S. Cl.
CPC ....... *H04M 15/66* (2013.01); *H04M 15/8228* (2013.01); *H04W 4/029* (2018.02); *H04W 4/24* (2013.01); *H04W 8/18* (2013.01); *H04W 76/10* (2018.02); *H04M 15/8038* (2013.01); *H04W 28/08* (2013.01); *H04W 76/12* (2018.02); *H04W 76/32* (2018.02)

(58) Field of Classification Search
USPC .......................................... 705/40; 714/4.11
See application file for complete search history.

(56) References Cited

U.S. PATENT DOCUMENTS

| | | | |
|---|---|---|---|
| 2015/0038111 A1* | 2/2015 | Lopez Nieto | H04W 4/24 455/406 |
| 2015/0207940 A1* | 7/2015 | Li | H04L 65/1016 370/259 |
| 2015/0223042 A1* | 8/2015 | Li | H04W 4/24 455/406 |

OTHER PUBLICATIONS

European Patent Office, Extended European Search Report for European Patent Application No. 15165184.1, dated Sep. 28, 2015.
Office Action on corresponding EP patent application No. 15165184.1, dated Jul. 5, 2018.
Office Action on corresponding EP patent application No. 15165184.1, dated Jun. 24, 2019.

* cited by examiner

SYSTEM AND METHOD FOR MANAGING ONLINE CHARGING SESSIONS

FIELD

The present disclosure relates generally to computer networks. More particularly, the present disclosure relates to a system and method for managing online charging sessions.

BACKGROUND

Users or subscribers often access computer networks via service providers, for example Internet Service Providers (ISPs). The service providers offer online capabilities and a variety of services often at a range of fees. Service providers may have dedicated servers for different subscriber segments and deployment use cases, for example, home traffic vs. roaming, prepaid vs. post-paid, different virtual operators, such as Mobile Virtual Network Operator (MVNOs), and the like.

With different subscriber segments and various deployment use cases, online charging systems (OCSs) have been developed to attempt to accurately charge subscribers. In some cases, subscribers may interact with various OCSs, for example, if the subscriber is roaming to a different network or zone, which may charge at a different rate than the user's home rate, or according to a richer service plan offering than the user's home plan. In some further cases, roaming data passes and bolt-ons with top-ups may be available in addition to the traditional higher rate roaming charge. When a subscriber charging session moves between various OCSs, there is a need to be able to change OCS during an ongoing subscriber data session, without forcing the subscriber to log-off and login to a new OCS.

It is, therefore, desirable to provide an improved system and method for managing online charging systems.

SUMMARY

In a first aspect, the present disclosure provides a method for managing an online charging session, the method including: establishing a subscriber data session on a network; establishing a connection with an initial online charging system; detecting a condition change in the session; determining whether the condition change is associated a change in the online charging system; if the condition change is associated with a change in the online charging system, determining a new online charging system; terminating a connection to the initial online charging system while maintaining the subscriber data session; and establishing a connection with the new online charging system; otherwise continuing the session with the initial online charging system.

In a particular case, the new online charging system may include a different charging policy or charging method than the initial online charging system.

In still another particular case, terminating of the connection to the initial online charging system and the establishing a connection with a new online charging system may include re-establishing the connection with the online charging system using different session parameters.

In yet another particular case, terminating the connection to the initial online charging system comprises terminating a Gy session to the initial online charging system.

In still yet another particular case, establishing the connection to the new online charging system may include establishing a Gy session to the new online charging system.

In a particular case, the condition change may be a change in the subscriber's location, a change in the subscriber's data plan, a predetermined time change, or a load balancing change.

In another particular case, the change in the subscriber's data plan may be an increase or decrease in a data limit or an increase or decrease in data allowance.

In still another particular case, the change may be a change in the subscriber's location and subscriber location information is retrieved from a probe operatively connected to a Radio Network Controller.

In yet another particular case, the subscriber's location change may be a geographic zone based change.

In still yet another case, establishing a subscriber data session may include determining subscriber session information.

In another particular case, subscriber session information may include subscriber location information, subscriber identification information, subscriber IP information, or subscriber Access Point Name (APN) information.

In another aspect, there is provided a system for managing an online charging sessions, the system including: a policy charging enforcement function (PCEF) configured to establish a subscriber data session on a network; a control plane engine configured to establish a connection with an initial online charging system and configured to detect a condition change in the session; a processor configured to determine whether the condition change is associated a change in the online charging system and further configured to, if the condition change is associated with a change in the online charging system, determine a new online charging system; terminate a connection to the initial online charging system while maintaining the subscriber data session; and establish a connection with the new online charging system; otherwise continue the session with the initial online charging system.

In a particular case, the new online charging system may include a different charging policy or charging method than the initial online charging system.

In still another particular case, terminating of the connection to the initial online charging system and the establishing a connection with a new online charging system may include re-establishing the connection with the online charging system using different session parameters.

In yet another particular case, terminating the connection to the initial online charging system may include terminating a Gy session to the initial online charging system.

In still yet another particular case, establishing the connection to the new online charging system may include establishing a Gy session to the new online charging system.

In a particular case, the condition change may be a change in the subscriber's location, a change in the subscriber's data plan, a predetermined time change, or a load balancing change.

In another particular case, establishing a subscriber data session may include determining subscriber session information.

Other aspects and features of the present disclosure will become apparent to those ordinarily skilled in the art upon review of the following description of specific embodiments in conjunction with the accompanying figures.

BRIEF DESCRIPTION OF THE DRAWINGS

Embodiments of the present disclosure will now be described, by way of example only, with reference to the attached Figures.

DETAILED DESCRIPTION

Figure 1:
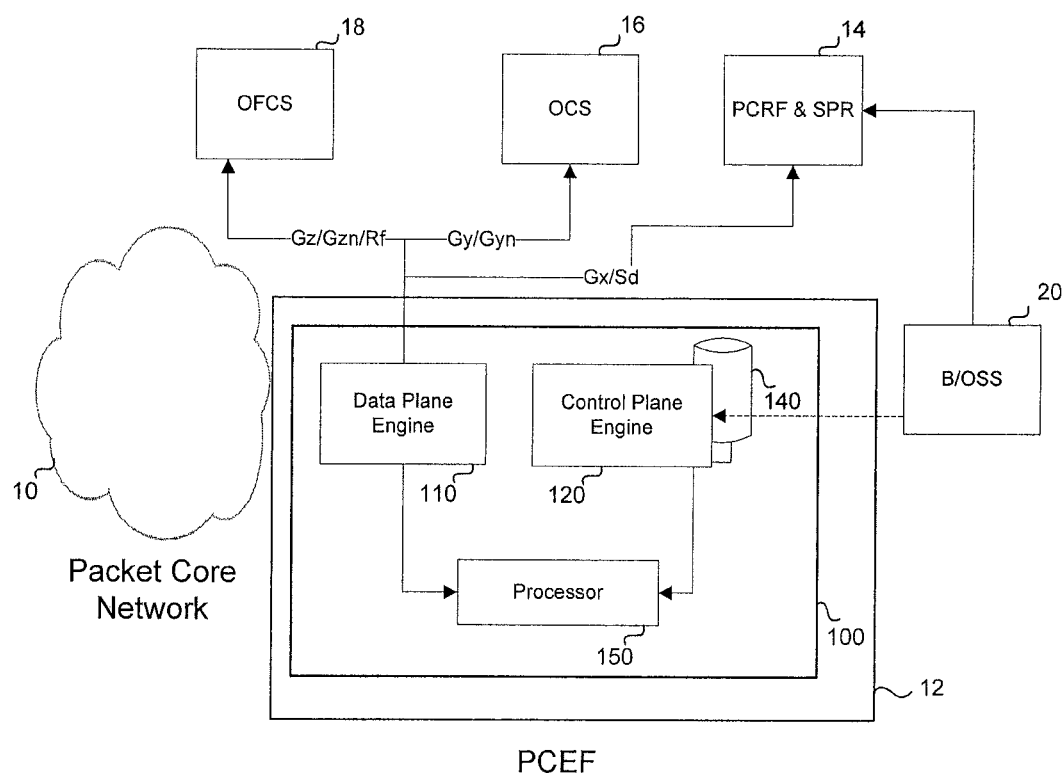
FIG. 1 illustrates a system for managing online charging sessions according to an embodiment.

Generally, the present disclosure provides a method and system for managing online charging sessions by, for example, managing charging sessions with online charging systems (OCS). The system is configured to review policies associated with a user or subscriber and a subscriber session. The system determines a charging session based on the associated policies. The system monitors for any changes in conditions of the subscriber session. If the system determines that there are changes that require a new or a different charging session, which may require a connection to a new OCS or a connections with different charging parameters to the same OCS, the system terminates an existing Gy session and creates a new Gy session to reflect the correct OCS. It is intended that the system terminates the existing Gy session and creates a new Gy session without terminating the subscriber's session or otherwise impacting the subscriber's experience.

In monitoring for any changes in the subscriber session, it is intended that the system monitors for various messages or condition changes. For example, a Charging-Information Attribute Value Pair (AVP), and upon any Credit Control Answer (CCA) message and Re-Authorize Request (RAR) message received from the Policy Charging Rule Function (PCRF). The system is configured to detect changes in the Primary-Event-Charging-Function-Name AVP, or secondary, after failover, or the like. Conventional systems do not allow changing an OCS or a charging session in the middle of the Gy session and require the Internet Protocol Connectivity Access Network (IP-CAN) session to terminate and be restarted on a desired OCS. Thus the user would be forced to end the current user session and restart a separate session to ensure the desired OCS is charging the data. The system described herein is configured to connect to the desired OCS without ending the data session by, for example, terminating the existing Gy session and creating a new Gy session with the desired OCS.

Typically, the charging-information AVP is passed over the Gx connection at the beginning of the session to indicate the primary and the secondary OCS for the session. The Gy connection is initiated with the primary OCS. The secondary OCS is contacted only if there is a failure in the primary OCS. The primary OCS and the secondary OCS are expected to be in-synch about the users' charging sessions. Having a primary OCS failover to a secondary OCS is different from OCS re-selection in which a new OCS, which is unaware of the subscriber session, is connected to by the session. Further, it is intended that the new OCS has different charging policies than the primary OCS and secondary OCS established at the beginning of the user's session. Conventionally, the primary OCS and secondary OCS are determined in the beginning of the Gx session, and traditionally, the PCRF will have to tear down the Gx and IP-CAN sessions if the OCS needs to be changed.

In cases where the PCRF may not have the ability to determine the desired OCS, or communicate the desired OCS over Gy, the network operator may program predetermined conditions or policies to trigger the process of changing the OCS according to different network conditions.

The system described herein is intended to enable a gateway device, for example a Packet Data Network Gateway (PGW), a GPRS Gateway Support Node (GGSN), a Traffic Detection Function (TDF), a switch, a router, a deep packet inspection element (embedded or standalone), or the like, to dynamically change or reselect the serving Online Charging System (OCS) during the subscriber's data session without interruption to the session. The system is intended to reduce the overall network wide signaling overhead that may be incurred otherwise when the IP-CAN session is terminated and restarted on the desired OCS. The system is intended to improve the subscribers' experience by avoiding service interruption and improve the signaling efficiency in the network.

It is intended that the system may be deployed and work with various use cases, including, for example, bill shock prevention in accidental roaming scenarios, converged billing plans for small and medium enterprises, zone based charging, and value added services on dedicated OCS platforms, and the like. The embodiments of the system and method may be integrated with standard Gx and Gy Diameter Applications defined by the Internet Engineering Task Force (IETF), 3rd Generation Partnership Project (3GPP), and 3GPP2 (CDMA), standardization bodies.

FIG. 1 illustrates a system 100 for managing online charging sessions. The system 100 is operatively connected to a packet core network 10 and receives and transmits packets to and from the network 10. The system 100 includes a data plane engine 110, a control plane engine 120, a database 140 and a processor 150. The system 100 may be a component of a Policy and Charging Control structure or a component of a Policy Charging Enforcement Function (PCEF) 12 or may be operatively connected to the PCEF 12. The system 100 in FIG. 1 includes standard components of a Policy and Charging Control structure.

The PCEF 12 can be a Gateway providing connectivity to the packet core network, allowing basic classification, metering and enforcement of traffic, and the like. In some cases, a separate Deep Packet Inspection (DPI) entity may be included, with enhanced classification, metering and enforcement abilities, augmenting the Gateway. In other cases, the Policy and Charging Control structure may include a combination of the PCEF 12 and the DPI device and the system 100 may be incorporated into either of these devices or operatively connected with both or either device. In some cases, the system may be a distributed system, and components of the system may be hosted on a plurality of network devices.

The system 100 is further operatively connected to a Policy Charging Rule Function module (PCRF) 14. The PCRF 14 is configured to store logic for the packet core network and may make decisions on the Quality of Service (QoS) each subscriber is entitled to as well as the charging methods applicable for each subscriber (offline or online) and the charging characteristics of any of the methods. The system 100 is configured to query information relating to the charging rules and charging methods from the PCRF 14.

The system 100 may also query data stored on at least one Online Charging System (OCS) 16. The OCS 16 manages various charging attributes associated with each subscriber, which may include, for example, the subscriber's account balance, reported usage, quotas, or the like, and may transmit the various attributes to the system 100. Further, for offline data, the system 100 may be operatively connected to an Offline Charging System (OFCS) 18, which is configured to format the subscriber's usage tracked by the PCEF, for offline processing. Although, only a single OCS is shown, it will be understood that the system 100 may be operatively connected to a plurality of OCSs or each OCS may include a plurality of charging methods or schemes.

Within the system, the control plane engine 120 is configured to include logic related to the processing of signaling information received from external systems, for example, OCS, OFCS, PCRF, and the like. The control plane engine 120 interacts with the data plane engine 110 to ensure that the system operates as configured, for example, to block access to network resources when users reach their quota limits. The data plane engine 110 includes data plane functionalities required for a PCEF/TDF, for example, packet inspection, switching, diverting to third party servers, shaping packets, marking packets, or blocking packets, categorizing and classifying packets, metering usage, modifying packets, and the like.

In the example embodiment of the system 100 shown in FIG. 1, the system 100 is deployed in the PCEF 12 which may act as a separate entity from the Gateway (for example, a GGSN in a 3G network, a P-GW in LTE network or the like). The PCEF 12 may further have enhanced DPI and subscriber awareness capabilities.

It is intended that the system 100, either as a component of the PCEF or a standalone device, can be connected to the PCRF 14 and at least one OCS 16, and can receive information regarding the subscriber's profile from a provisionable repository, such as the database 140, or external component (not shown. The information may be received, for example over Simple Object Access Protocol (SOAP), Lightweight Directory Access Protocol (LDAP) or the like; Packet Data Protocol (PDP) context information, including subscriber location information and network conditions that can be retrieved from Remote Authentication Dial In User Service (RADIUS), GPRS Tunneling Protocol—Control (GTP-C), Dynamic Host Configuration Protocol (DHCP) v4, DHCP v6; and the like. This information is processed by the control plane engine 120 in the system and may further be used by the data plane engine 110.

In an example, subscriber location information, for example, Cell ID for a subscriber, may be retrieved from the 3GPP-User-Location-Info AVP in RADIUS, the User Location IE (Information Element) in GTP-C, or the like. An Authentication, Authorization, and Accounting (AAA) server or a Gateway can forward RADIUS traffic to the control plane engine 120. For example, GTP-C traffic may be detected and captured by the data plane engine 110, while RADIUS traffic may be detected and captured by the data plane engine 110 or forwarded from the AAA server. The data plane engine 110 forwards the traffic to the control plane engine 120 for further processing. In cases that GTP-C or RADIUS are not visible to the system 100, or in a case where the subscriber location information does not exist or Cell ID is not exposed in it, a probe adjacent to or operatively connected to a Radio Network Controller (RNC) may provide Cell ID information to the system 100 over a proprietary or third party protocol. The probe may provide the current subscriber location, including the base station and the sector to the system or to external components within the PCC framework, for example, the PCRF, PCEF, TDF, or the like.

It is intended that a change in the location can trigger a Diameter Credit Control Request (CCR) update over Gx from the system 100 to PCRF 14. This change is intended to cause the PCRF to signal the PCEF to switch OCSs. In other cases, the system 100 may locally make that decision and switch the Gy session to a different OCS.

A Billing and Operational Support Subsystem (B/OSS) 20 is configured to support the IT processes within the operator's network, for example, to enable provisioning, system integration, billing mediation, and the like. The B/OSS may be operatively connected to the PCRF 14 or the control plane engine 120.

Figure 2A:
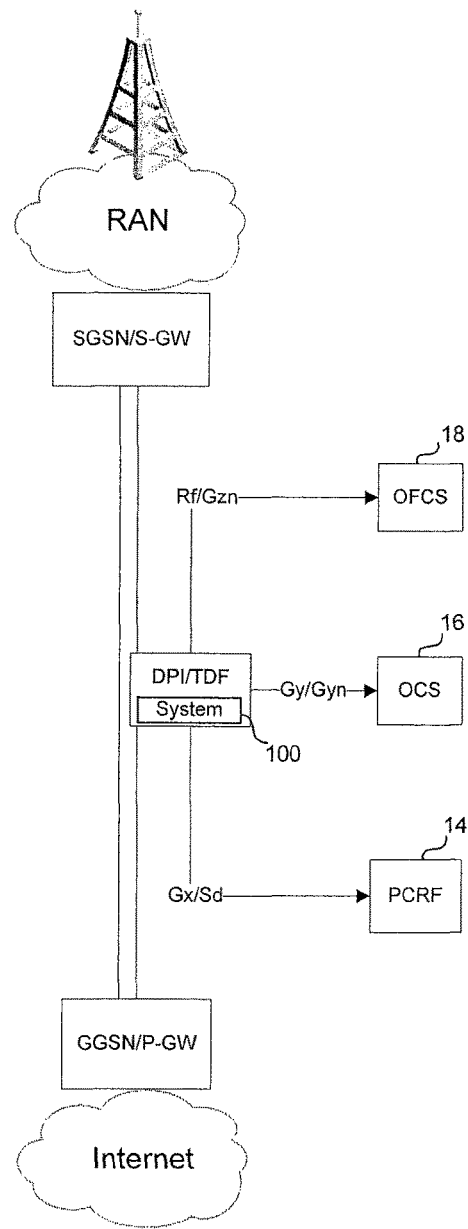
FIGS. 2A and 2B illustrate example environments for a system for managing online charging sessions.
Figure 2B:
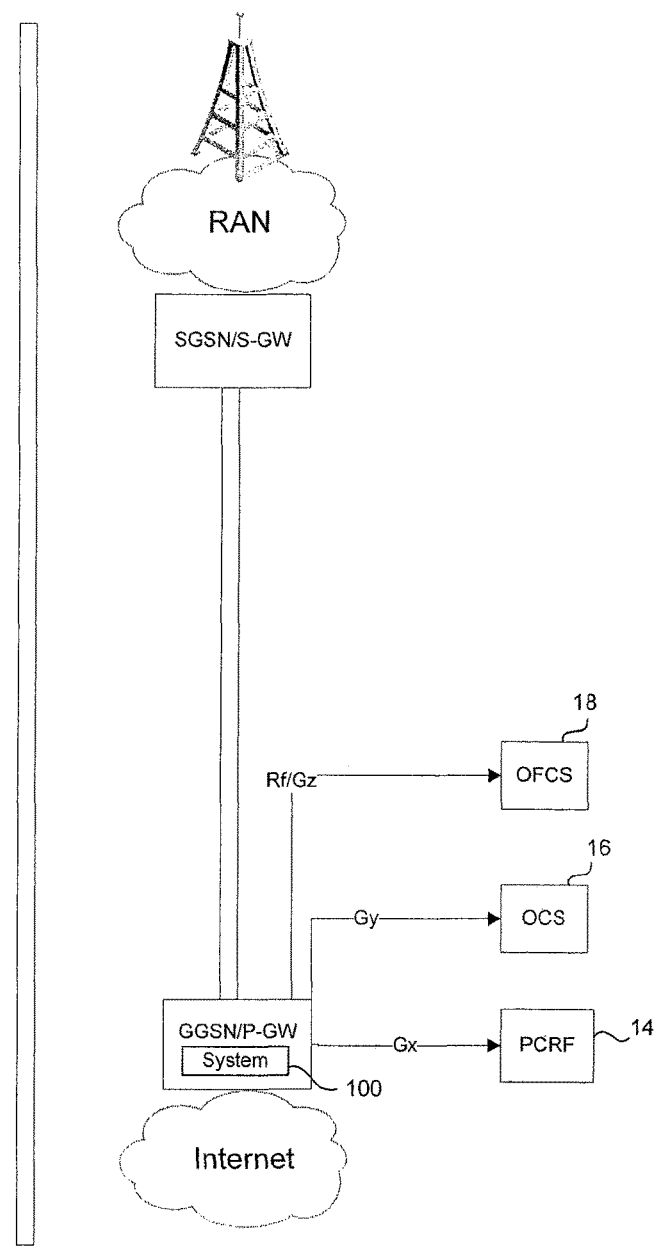

FIGS. 2A and 2B illustrate example environments for the deployment of the system 100. In some cases, the system 100 may be included as a separate DPI entity as shown in FIG. 2A and may be operatively connected to the PCRF, OCS and OFCS. In other cases, as shown in FIG. 2B, the system 100 may be included as part of the Gateway of Traffic Detection Function. It will be understood that in some cases, the system 100 may be a distributed system and the modules of the system may be located on separate physical devices.

FIGS. 2A and 2B illustrate two deployment styles that are intended to be compatible with the 3GPP standards. In some cases, the embedded modules, such as the control plane engine 120 and data plane engine 110, may have different processing capacity and depth of functionality as appropriate for a particular standard or application.

Figure 3:
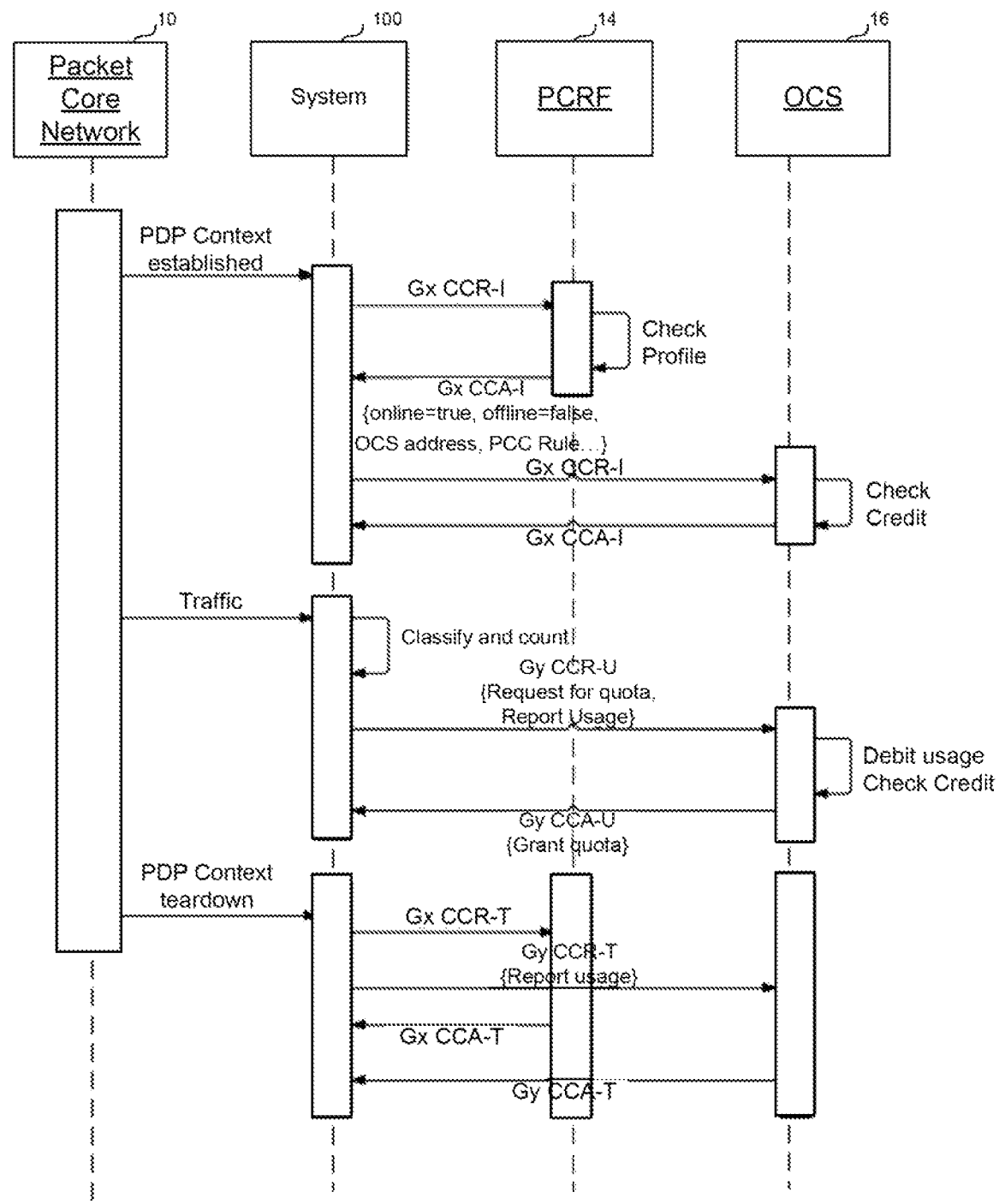
FIG. 3 illustrates traffic flow during a Gx session initiation phase.

FIG. 3 illustrates an OCS selection process during a Gx session initiation.

When an IP-CAN session is created for a subscriber, the system 100 or the PCEF receives PDP context from the network 10. The system 100 is configured to establish a Gx/Sd session with the PCRF 14. The PCRF 14 returns any associated Policy Control and Charging (PCC) rules and Application Detection rules to the system and may indicate what charging method is applicable for that subscriber. The system 100 is further configured to establish a Gy/Gyn session with the OCS 16. During the Gx/Sd session initiation, the PCRF 14 may provide address information about the primary and secondary OCSs, for example address information that may conform to the 3GPP standard. The address information is used by the system 100 to establish a Gy/Gyn session with the OCS 16 (as shown in FIG. 1). It will be understood that the Gy session refers to the charging session between the system 100 and PCEF and the OCS while the Gyn session refers to the application based charging session between the TDF and the OCS. The IP-CAN session is then initiated and the system 100 receives traffic related to the established session.

The data plane engine 110 of the system 100 is configured to process the traffic associated with a given PDP context. The system is able to classify the traffic according to various characteristics, for example, by the 5-tuple identifiers, which may include source and destination IP addresses, source and destination protocols and protocol ID, of a TCP or UDP flow; a signature of the packets identifying the higher level applications using this traffic; pattern of a URL of HTTP traffic, or the like. The traffic type to be identified is determined by configurable policies that may be stored by the system or accessed by the system and stored in an external repository. In some cases, these policies determine whether applications should be classified separately, for example, category 1=Facebook™ category 2=Twitter™, or jointly, for example, category 3=Facebook or Twitter.

The system 100 is configured to manipulate the traffic, for example, by shaping the traffic, block at least some of the traffic, redirecting at least some of the traffic to a different destination than its original one, or the like. The system 100 is also aware of the characteristics of the PDP context and the subscriber associated with the PDP context. The system is able to act according to this information and associate the PDP context and associated subscriber with the traffic. Further, in FIG. 3, a PDP content tear down occurs and indicates that the user or the user's device has terminated the data session. The associated charging session is terminated on the termination of the data session.

Figure 4:
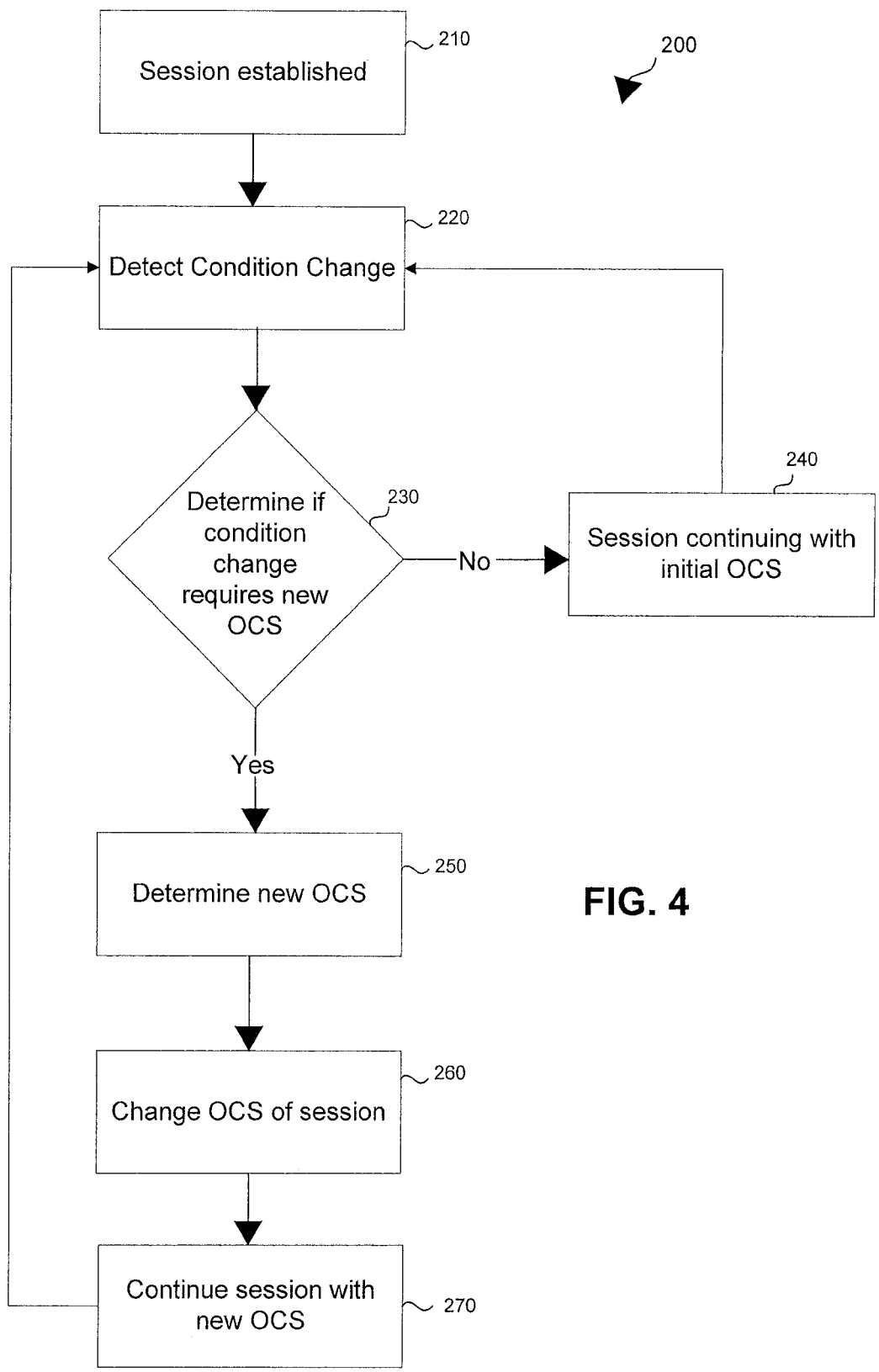
FIG. 4 is a flowchart of a method for managing online charging sessions.

FIG. 4 illustrates a flow chart of a method 200 for managing online charging sessions.

At 210, a session is established. The system 100 establishes a Gy/Gyn session with an initial OCS 16 in order to associate a charging method and charging policies with the session.

At 220, the system 100 detects a condition change. The condition change may be triggered by, for example, a change in the subscriber's location, reaching a predetermined threshold of data use by the subscriber, a change in the subscriber's data plan, or the like. The condition change may be detected by the system 100 or may be detected by the PCRF 14 and the PCRF may notify the system of the condition change.

In some cases, the control plane engine 120 may detect the condition change, for example if the PCRF is installing a new PCC rule, a location update is received from the core network (for example, from the packet gateway (PGW), signaling is received over SOAP from the B/OSS 140. In other cases, the data plane engine 110 may detect the condition change, for example if the change is related to certain traffic types, if DSCP marking or packet signature is detected, or the like.

At 230, the system 100 determines whether the change in condition should include a change in the OCS 16 or a change in the charging parameters, which may require the establishment of a new charging session with the OCS. In some cases, the change may be a change in the subscriber's data plan, for example, an increased or decreased data limit, an increased or decreased daytime minute allowance, or the like, and the subscriber may not currently be at the limit on the network plan. In these cases, at 240, the system 100 is configured to allow the session to continue without a change in the OCS.

In other cases, the change may trigger conditions that are compatible with a change in the charging session and/or the OCS 16, for example, a change in subscriber's location where the subscriber has moved into a roaming territory.

At 250, the system 100 determines a new charging session and/or new OCS to be used for the subscriber's data session. In some cases, the PCEF or TDF determines which OCS to connect to, based on local policy or instruction from the PCRF or other external sources, for example, SOAP. In other cases, the new OCS may be determined by the system based on the rules queried from or pushed by the PCRF. In other cases, the PCRF may determine the new OCS and inform the system 100 as to which new OCS to be used by the session.

In an example, the OCS may need to be reselected based on the PCRF installing a PCC rule called ToggleOCS. In this case, once the system 100 receives this PCC rule, the system 100 switches the current OCS to a new OCS, as required by the PCC rule.

In another deployment scenario, the system might determine from the core network that the user has changed his location. In this case, upon determining the change in location, the system 100 can either inform the PCRF of the location change and the PCRF in turn installs the ToggleOCS rule or alternatively the system 100 might make a local decision and reselects the OCS without contacting the PCRF.

In still other cases, the B/OSS might have an administrative condition (for example, user plan change), which results in pushing a SOAP message to the system 100 indicating that the user's charging session needs to be migrated to a new OCS. The B/OSS might also contact the PCRF and the PCRF may in turn contact the system by installing a PCC rule to reselect the OCS for the user.

At 260, the control plane engine 110 is configured to change the OCS for the session, without terminating the session. In some cases, the system 100 changes the OCS by terminating the Gy session of the current subscriber's sessions and starting a new Gy session with a new OCS, without terminating the session connection with the subscriber. In some cases, charging sessions are terminated with the original OCS using a CCR-Terminate message and a new charging session may be established with the new OCS using a CCR-Initial message. It is intended that by sending the CCR-Terminate message to the original OCS and sending the new OCS a CCR-Initial message, the Gy session of the subscriber may be managed without terminating the data session connection with the subscriber. Managing the OCS for the session is intended to be accomplished without the reestablishment of the IP-Can/PDP context.

At 270, the system 100 continues the session with the new OCS. The change in the OCS is intended to be done without any disruption to the subscriber's session.

An example of the use of the method is shown in a use case of a mobile user entering a bordering area between two operators. The border area is defined by cell identifiers.

In this example use case, the network operator wants to deliver a competitive service experience to its subscribers and relieves them from the fear of bill shock due to accidental roaming. At the same time, the network operator would like to ensure that roaming users crossing a border area into a foreign region covered by a roaming partner are charged fairly and according to the announced or advertised roaming rates. In an example, operator A may have a roaming agreement with operator B and operator A has an OCS platform for domestic usage and a separate OCS platform for roaming usage.

A challenge in the example use case is that while the user is in the bordering area her data traffic may be carried by a roaming partner even through the user may not be roaming. If she is in a border area where both operators have coverage, the user may be served by operator B and incur roaming charges, although her location indicates her to be within the home coverage area. Operator A would prefer to offer its users seamless experience and direct their charging to the right OCS platform, by charging the users home area rates when they are within the home area, even if they are being served by operator B.

Further, if a subscriber crosses the border area into the foreign region, she continues to be served by the roaming partner; however, her charging session needs to be switched to the OCS platform that handles roaming usage.

Thus, in the example, reselection of the OCS is needed when a handover happens, for example, a handover between cells that does not require reestablishment of the IP-CAN/PDP context.

Figure 5:
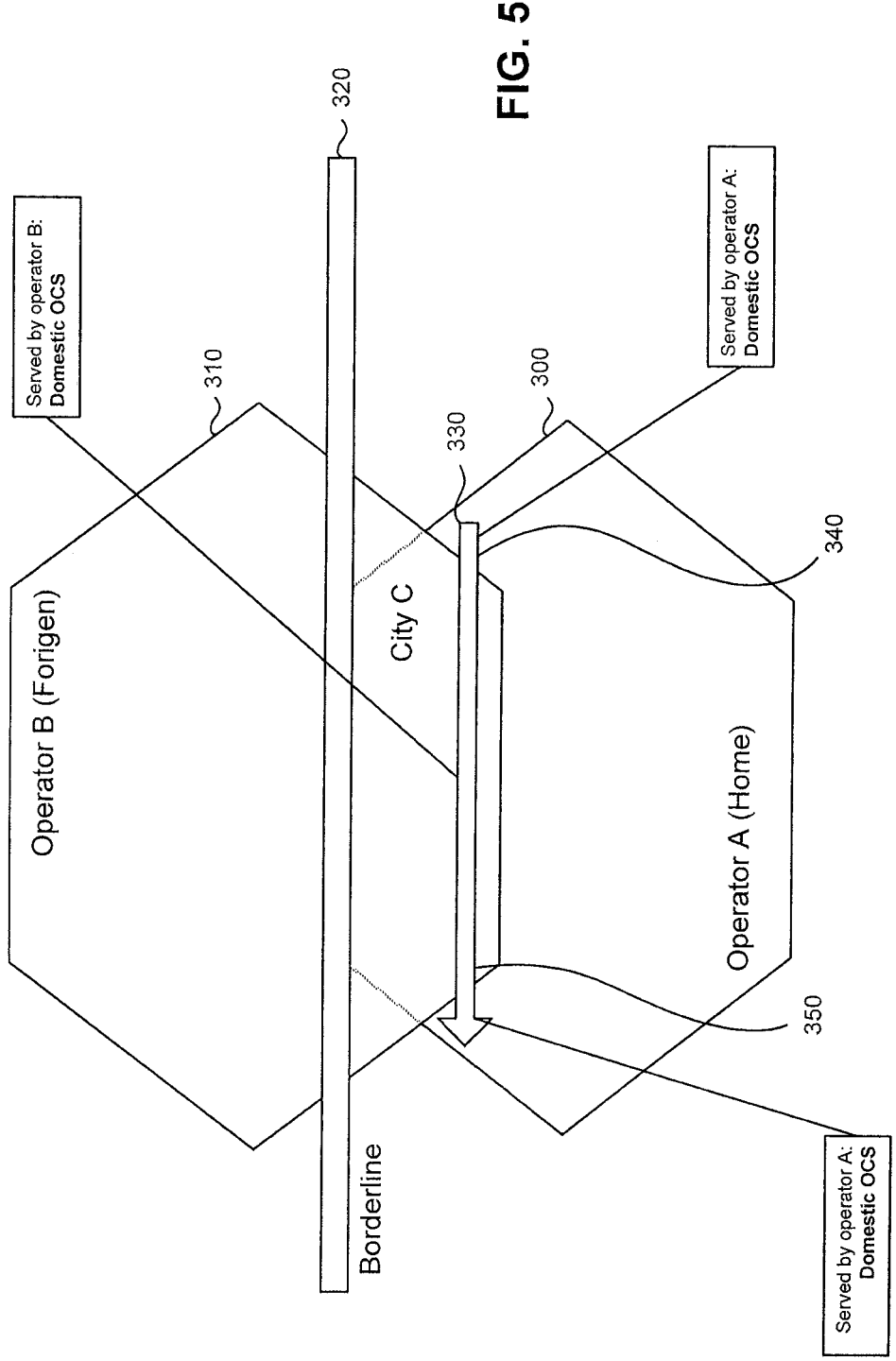
FIG. 5 is an example of subscriber movement through a borderline region.

FIG. 5 is a diagram of an example subscriber movement through a borderline region. The diagram represents an area 300 served by operator A and an area 310 served by operator B with a borderline 320 between the two operators. The diagram may represent a dual city, City C, on either side of a border between countries. The path 330 of a subscriber of operator A traveling on the borderline between operators (in the area of City C), getting service from operator B, but without roaming charges or reestablishment of the PDP context.

When a subscriber is roaming from its domestic operator A to operator B (by, for example, entering an area served by operator B, at point 340), but remains within the domestic geographic region of operator A, it is intended that the subscriber continues to be charged through a domestic OCS. Although the system 100 may detect a condition change, the system determines that the condition does not require a change in the OCS of the IP-CAN session. As such, the session will continue with a domestic OCS. Further, when the subscriber leaves the area covered by operator B, for example at point 350, the system 100 again may be notified of a condition change and again decides that no change in OCS is required.

Figure 6:
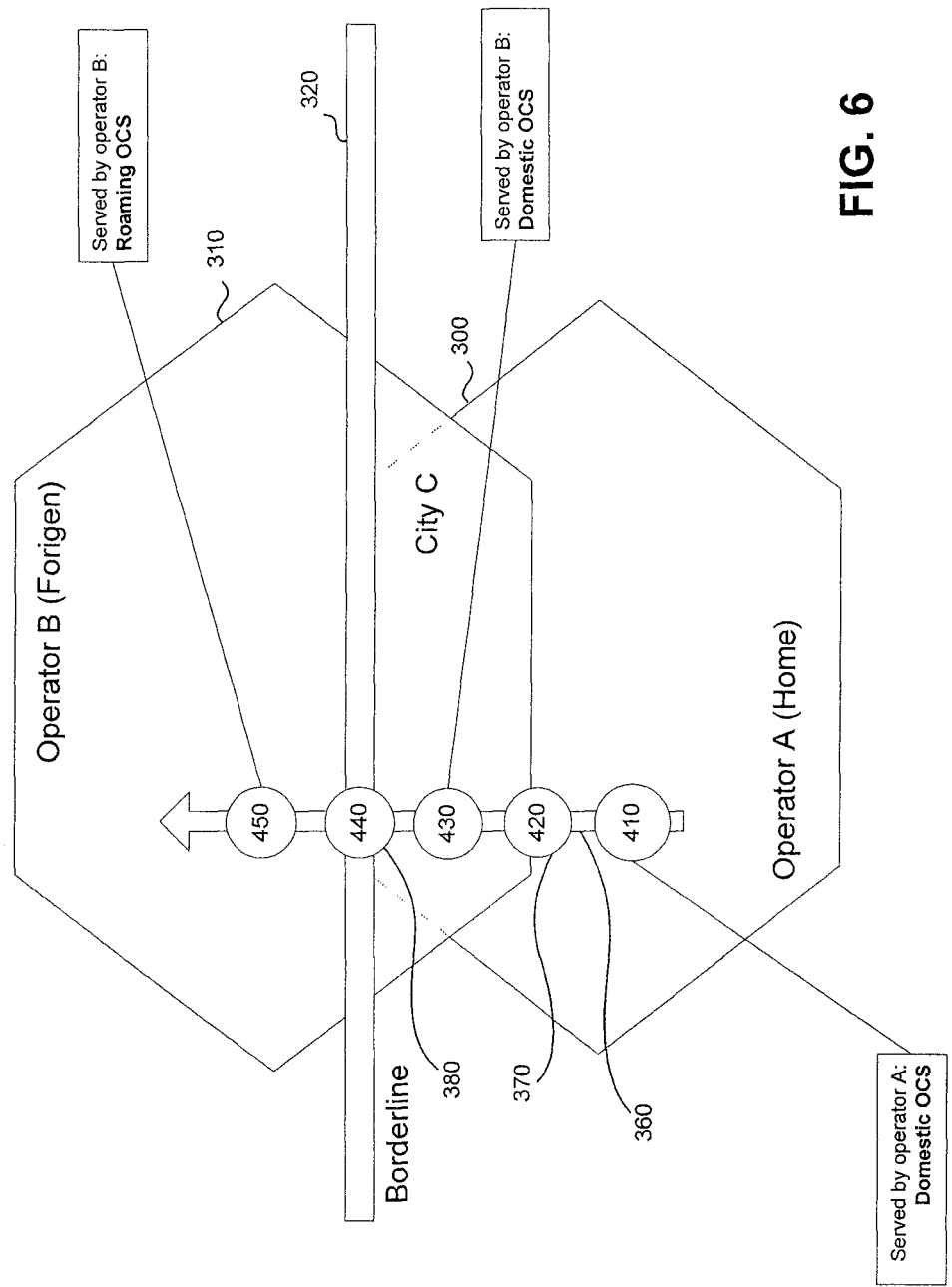
FIG. 6 is another example of subscriber movement through a borderline region.

FIG. 6 is a diagram of another example of subscriber movement through the borderline region. The subscriber may be travelling towards the borderline 320, as shown in an example path 360. The subscriber may switch its domestic operator A area 300 to the foreign operator B area 310 (by, for example, entering an area served by operator B, at point 370). A hard handover may occur due to the operator change, for example a public land mobile network (PLMN) change, but the OCS may not be changed until the subscriber leaves the area serviced by Operator A, for example on a cell handover, at point 380.

It is intended that the system 100 is configured to work within the constructs of the Gx interface standards, the Gx session will have to be terminated or torn down by PCRF according to the reported Cell ID. The PCRF will indicate to the system 100 to report location changes at Cell ID level. In some cases, if the system 100 is not able to report location (for example, due to unavailability of this information from the core network), the PCRF may have integration with the system components which are aware of the subscriber location such as Home subscriber server (HSS), Home location register (HLR), Mobility management entity (MME), or the like.

Figure 7A:
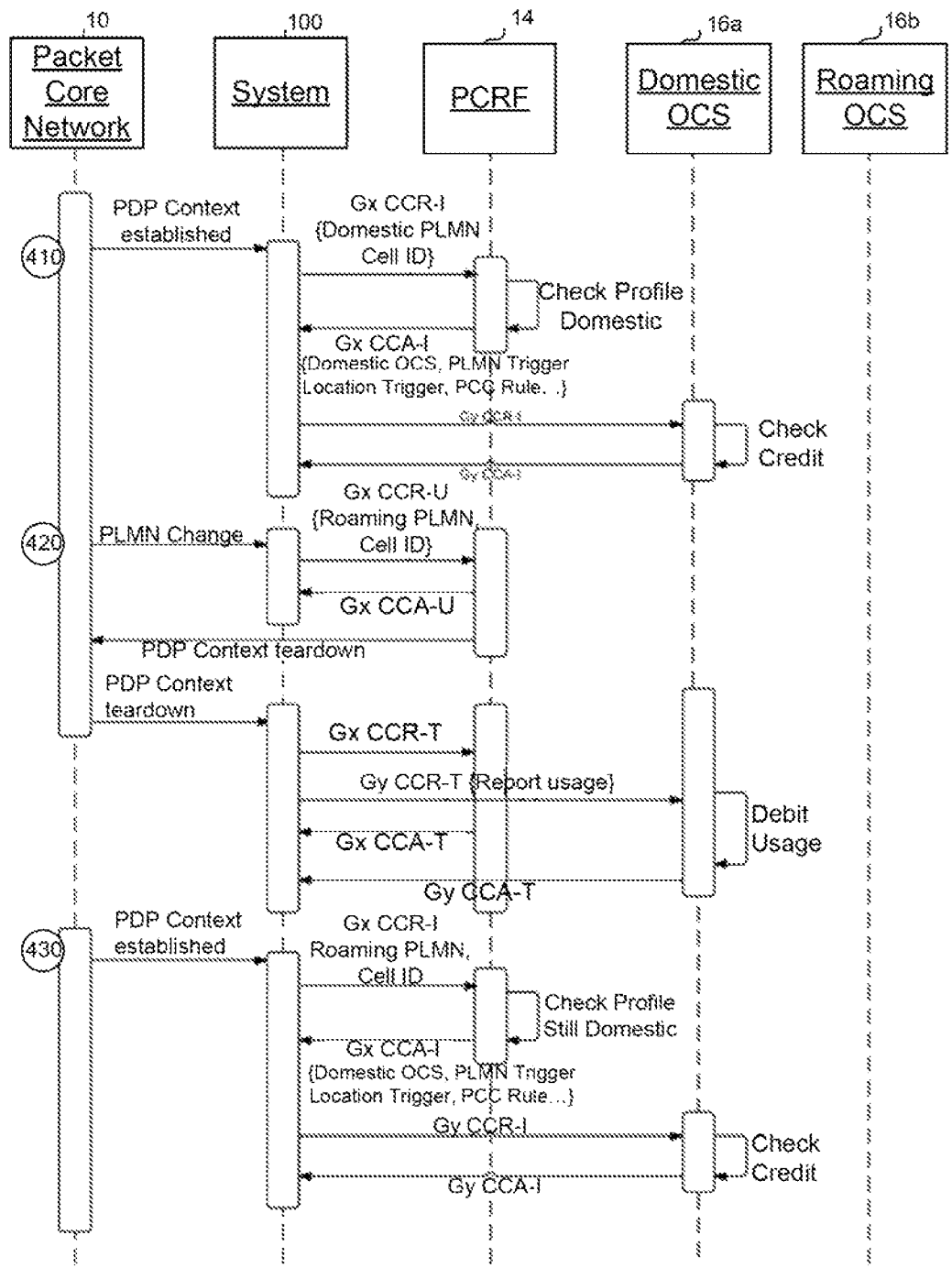
FIGS. 7A and 7B illustrate traffic flow for the example of FIG. 6 using a system for managing online charging sessions.
Figure 7B:
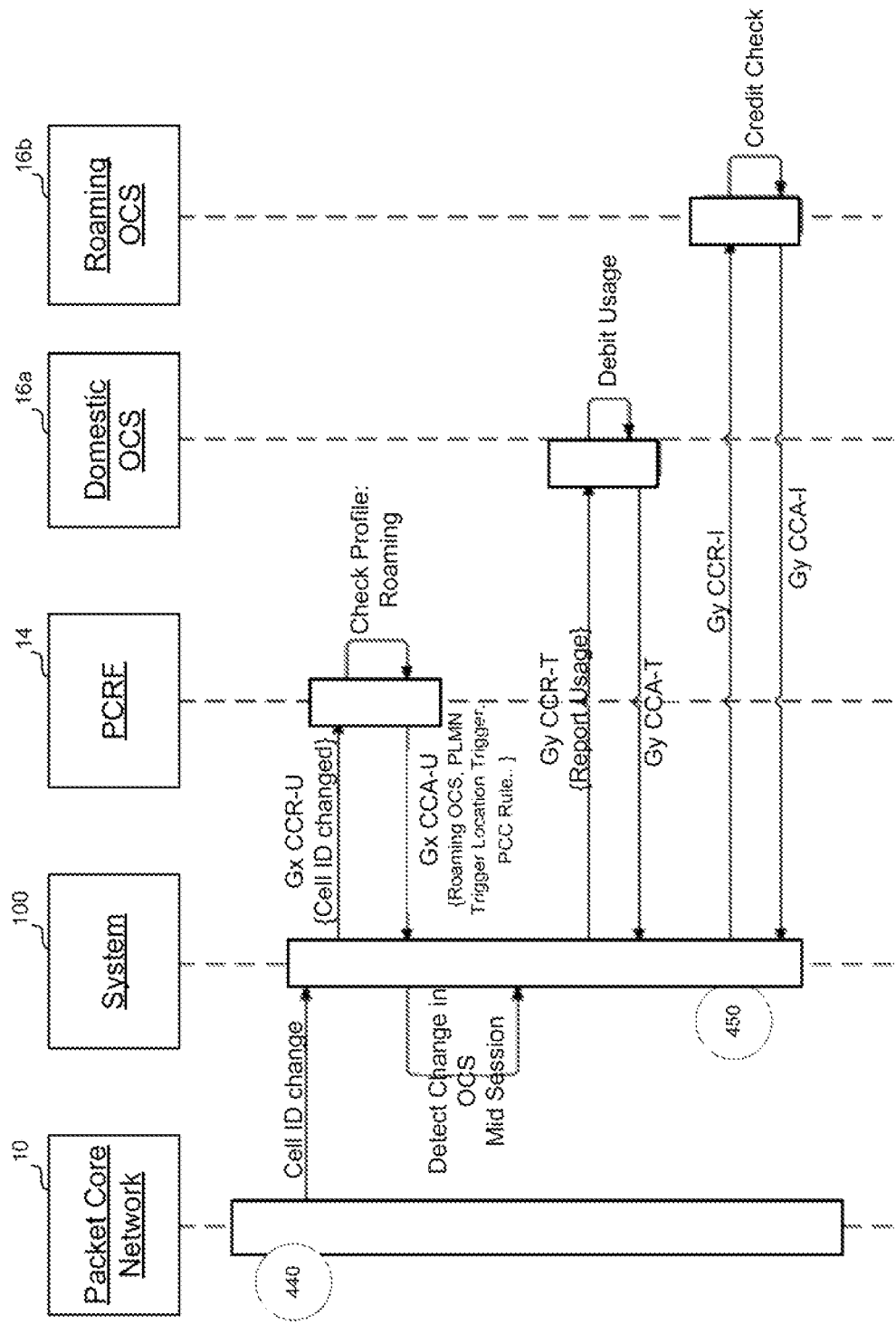

FIGS. 7A and 7B illustrates traffic flow for the example of FIG. 6, using a sequence diagram.

At 410, corresponding to item 410 on the subscriber's path 360, the PDP context is established. The system 100 receives packets from the network 10 and a PDP context is established. The system 100 provides information to the PCRF 14 to determine the charging profile, and the PCRF 14 returns rules and triggers, for example, registering for updates on changes in location information of the subscriber, to the system 100 associated with the subscriber session. Further, the system creates a Gy session with a domestic OCS 16*a* as service is provided by the home operator, operator A and the subscriber is located within the home region.

At 420, the subscriber enters into the border area of City C. In some cases, the subscriber may experience an operator change, for example, a hard handover due to PLMN Change. In this case, the IP-CAN/PDP session is likely to be terminated, in a conventional manner, as users switch between roaming partners. The system 100 is configured to provide for the ability of hard handovers due to an operator change, as well as managing OCS sessions without terminating the IP-CAN/PDP session as detailed herein.

The GTP Delete Session and Delete Bearer messages, that are included in the 3GPP standard, may be exchanged within core network components and would result in triggering a CCR-Terminate message towards the PCRF. If the TDF is involved the PCRF terminates the session with the TDF according to standard 3GPP procedures. Once the session is terminated a new session is created after attaching to the roaming network's radio access. Based on procedures described in the 3GPP standard on whether the deployment is home routed or local breakout, the PCRF and OCS sessions are started again.

At 430, the subscriber receives service within the border area City C by the roaming operator and the domestic OCS. As such a new PDP context is established and the system 100 is configured to check profiles with respect to the session and determine that the domestic OCS 16*a* is still applicable to the subscriber session.

Referring to FIG. 7B, at 440, the subscriber begins to leave the border area of City C. A soft handover due to Cell ID change is completed and the system 100 detects a change in conditions. On reviewing the change, the system 100 determines that a new OCS is appropriate as the subscriber is now roaming, as the subscriber is now in the foreign region, and has left the home region. In determining the condition change, the system 100 is configured to detect changes in session parameters, for example, changes in the subscriber's location, changes in the subscriber's data plan, predetermined time changes, load balancing changes, or the like. On detecting a condition change, the system 100 is configured to determine if it is appropriate to modify the OCS session of the data session, for example by determining the subscriber's location has passed the border and is now in a foreign region and should be charged at a roaming rate.

At 450, the system 100 terminates the Gy session with the domestic OCS and creates a new session with a roaming OCS 16*b*. By creating a new Gy session, the subscriber can be properly charged according to the policies of the network operator. Further, the OCS session may be updated at the time the conditions change and a new OCS is appropriate given the new subscriber conditions without the requirement to end the subscriber's session and restart a new session with a new OCS. Therefore, instead of performing another hard handover or similar process involving signaling similar to the signaling during a hard handover when (according to Cell ID), when the subscriber begins to roam, the PCRF 14 will just signal a new OCS once the relevant location change happens, and the system 100 will reestablish the connection with the new OCS, without interruption to service.

It will be understood that a similar process could be used when the subscriber is returning to the home or domestic OCS from a roaming OCS. As the switch in OCS may be triggered by a cell handover, the switch is intended to be seamless to the user, and not normally result in PDP/IP-CAN re-establishment.

In the borderline roaming case, this may be the Cell ID coming from the location object in GTP-C. Other subscriber awareness protocols may also be supported, for example, RADIUS, GTP-C, DHCPv4 or v6, or the like. It should also be noted that the solution supports Diameter Vendor Specific Attribute Value Pairs (VSAs) to trigger the OCS reselection process if required.

Figure 8:
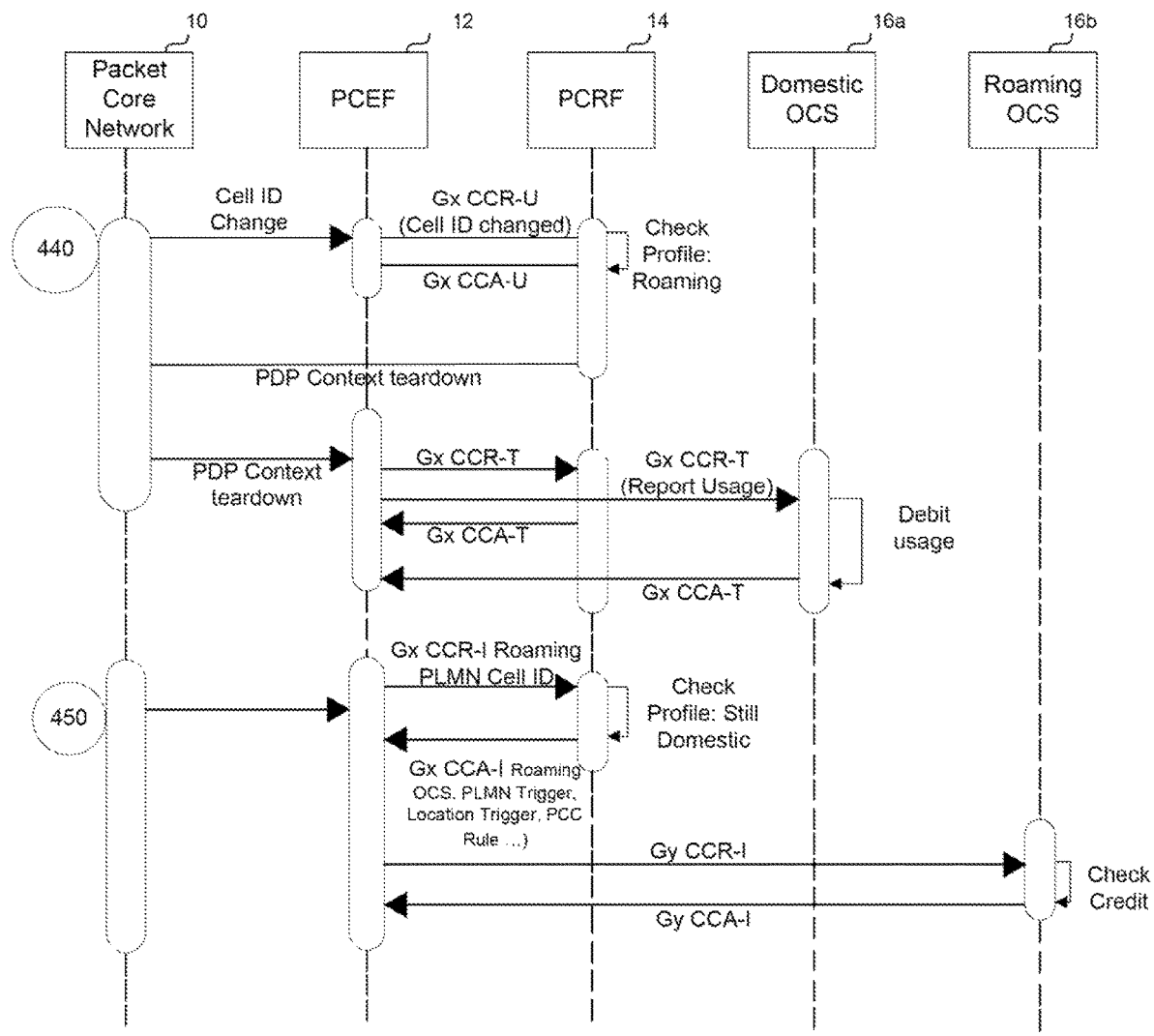
FIG. 8 illustrates traffic flow for the example of FIG. 6 without using a system managing for online charging sessions.

FIG. 8 illustrates a sequence diagram of changing an OCS for the example of FIG. 6, when the system described herein is not available. In particular, on a triggering event where it is noted that a new OCS is appropriate for the session, the session is ended, by a PDP Context teardown at 440 and a new session is established at 450.

Without the system 100 to switch the OCS platform during the IP-CAN session, the data session would typically need to be terminated and a new data session would be created in order to reselect the OCS platform to satisfy the charging requirements.

This typical solution degrades the subscriber's experience, by having to end the session and may further result in data session instability and signaling overhead.

The system 100 may further be advantageous in converged billing for Small Medium Enterprises. In this use case, an operator may have two different OCS systems, one for prepaid users and another for postpaid users. A challenge experienced by the operator may be to switch from the prepaid OCS to the postpaid one (or vice-a-versa) without terminating an ongoing subscriber data session.

In an example, the operator may offer Small and Medium Enterprise (SME) a plan in which their employees' usage from 8 AM to 5 PM is covered by the corporate and afterwards it is covered by their personal prepaid balance. In this case, the serving OCS platforms are reassigned during data sessions in the morning at 8 AM and in the evening at 5 PM. Without the system 100 detailed herein, the operator may have to implement the whole logic on one OCS (which might not be economically feasible depending on the existing OCS platform, as charging platforms for carriers and enterprises may have different capacity and cost) or will need to have the PCRF terminate the IP-CAN session and select the right OCS depending on the time of the day and the subscriber's plan.

With the system 100 for online charging sessions, the sessions can seamlessly be transferred from one OCS to another on the triggering condition of the time of day being 8 AM or 5 PM. The operator may ensure its policies are maintained, without requiring further logic development or terminating subscriber sessions at a predetermined time of day.

In a similar deployment scenario, subscribers might have multiple identifiers (for example, Mobile Subscriber Integrated Services Digital Network-Number (MSISDNs)) on their SIM cards. The MSISDN is generally the subscriber's mobile phone number. In an example, one MSISDN might be used for corporate use and another might be used for personal use. In this use case, the corporate account identified by the corporate MSISDN is used to charge usage during the business hours from 8 AM to 5 PM. Afterwards, the usage is charged towards the personal account identified by the personal MSISDN. In this case, the system 100, can be used to charge the usage towards the corporate MSISDN between 8 AM and 5 PM. At 5 PM, the system 100 terminates the charging session with the OCS and starts a new charging session with the same OCS but using the personal MSISDN. The same process may be repeated at 8 AM, the charging session is terminated with the OCS and a new session is started on the same OCS but using the corporate MSISDN. This use case can be implemented using other subscriber identifiers and is not necessarily tied to mobile use cases.

In another example, the system 100 may be used in zone based charging of subscribers. An operator may wish to offer competitive plans for certain geographic zones (for example, 1 GB of free video in downtown, or the like). In order to avoid impacting the existing charging system, the operator deploys a smaller scale OCS solution for these zones while the rest of the network is served by the primary OCS.

When the subscriber moves into any of the target geographic zones, the charging needs to be moved from the primary OCS to the smaller scale OCS that has the zone plans and business logic. The OCS may need to be reselected again, if the subscriber exceeds the allowed limit while, within the geographic zone. The system 100 is intended to provide a smooth transition for the subscriber, in that the subscriber's data session will not need to be terminated as she moves into the marketing specific zones. Without the system 100, the subscriber may experience two terminations may occur in the case described above: one termination to allow the selection of the small scale OCS and another to fall back to the primary OCS due to the subscriber being out of credit for the targeted geographic zone.

In yet another example, the system may be beneficial in dedicated Value Added Services (VAS) OCS platform. In this example, the operator may have two OCS platforms, one for main plans and another to implement innovative value added services. Examples of VAS include, for example, data passes, bolt-ons and the like.

As an example of this use case, a user may decide to buy a 5 GB video bolt-on during her data session. In this case, the system 100 is able to switch the OCS to the VAS OCS platform without terminating the data session. Similarly, when the user runs out of quota, she may notified and the system 100 is configured to switch her charging back to the primary OCS. The system is intended to allow OCS switching happens seamlessly without data session interruption. Without the system, the user's data session may need to be terminated when she buys the VAS and when the VAS expires or is exhausted.

In still another example, the system 100 may be used in load balancing and rebalancing use cases. OCS platforms might be deployed in geographically independent clusters. Each cluster may be treated as one OCS behind one Virtual IP (VIP).

If, in cases of OCS cluster overload by for example by mass calling events, unforeseen outages, energy management, or the like, some subscriber data sessions might need to be rebalanced. The current 3GPP/IETF specifications do not provide for an ability to perform this functionality outside credit control failure handling or initial session OCS selection. OCS selection at the beginning of the Gx session does not address the load imbalance issues quickly since more and more devices are always on.

The system described herein is intended to be used to rebalance the subscribers' data sessions in mid-session due to any external trigger, for example, PCRF signaling, provisioning call over SOAP/REST, or the like. This allows operators to have better control over the lifetime of the charging sessions.

In the preceding description, for purposes of explanation, numerous details are set forth in order to provide a thorough understanding of the embodiments. However, it will be apparent to one skilled in the art that these specific details may not be required. In other instances, well-known structures may be shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

What is claimed is:

1. A method for managing an online charging session, the method comprising:
    establishing an active subscriber data session on a network;
    establishing a connection by selecting an initial online charging system under an initial charging policy based on a policy charging rules function (PCRF);
    detecting a change in the subscriber's location to or from a roaming location;
    determining whether the location change is associated with a change in the online charging system, which requires the data session to be charged under a different charging policy;
    if the change in location is associated with a change in the online charging system which requires the different charging policy, then
        determining, via the PCRF, a new online charging system for the subscriber data session wherein the new online charging system has a different charging policy than the initial online charging system and wherein the new online charging system is determined based on the roaming location;
        terminating the connection to the initial online charging system by terminating a Gy session with the initial online charging system while maintaining the active subscriber data session; and
        establishing a connection with the new online charging system by staring a new Gy session with the new online charging system;
    otherwise continuing the session with the initial online charging system.

2. The method of claim 1, wherein the new online charging system further comprises a different charging method than the initial online charging system.

3. The method of claim 1, wherein the terminating of the connection to the initial online charging system and the establishing a connection with a new online charging system comprises re-establishing the connection with the online charging system using different session parameters.

4. The method of claim 1, wherein the change in the subscriber's location is based on a change in subscriber location information and subscriber location information is retrieved from a probe operatively connected to a Radio Network Controller.

5. The method of claim 4, wherein the subscriber's location change is a geographic zone based change.

6. The method of claim 1, wherein the detecting a change subscriber location in the subscriber data session comprises determining subscriber session information.

7. The method of claim 6, wherein the subscriber session information comprises subscriber location information, subscriber identification information, subscriber IP information, or subscriber Access Point Name information.

8. The method of claim 1, wherein the terminating the connection to the initial online charging system comprises sending a CCR-Terminate message to the initial online charging system.

9. The method of claim 1, wherein the establishing the connection to the new online charging system comprises sending a CCR-Initial message to the new online charging system.

10. A system for managing an online charging session, the system comprising:
    a policy charging enforcement function (PCEF) configured to establish a subscriber data session on a network;
    a control plane engine configured to select and establish a connection with an initial online charging system based on a policy and charging rules function (PCRF) and configured to detect a change in the subscriber's location to or from a roaming location;
    a processor configured to determine whether the location change is associated with a change in the online charging system, is not a failure of the online charging system, and further configured to, if the change in location is associated with a change in the online charging system, then
        determine, via the PCRF, a new online charging system for the subscriber data session, wherein the new online charging system has a different charging policy than the initial online charging system and wherein the new online charging system is determined based on the subscriber's location;
        terminate a connection to the initial online charging system while maintaining the active subscriber data session by terminating a Gy session with the initial online charging system; and
        establish a connection with the new online charging system by starting a new Gy session with the new online charging system;
    otherwise continue the connection with the initial online charging system.

11. The system of claim 10, wherein the terminating of the connection to the initial online charging system and the establishing a connection with a new online charging system comprises re-establishing the connection with the online charging system using different session parameters.

* * * * *